Nov. 20, 1951     J. S. MURRAY     2,575,926
SLEEP INHIBITOR FOR MOTOR VEHICLE OPERATORS
Filed April 12, 1949
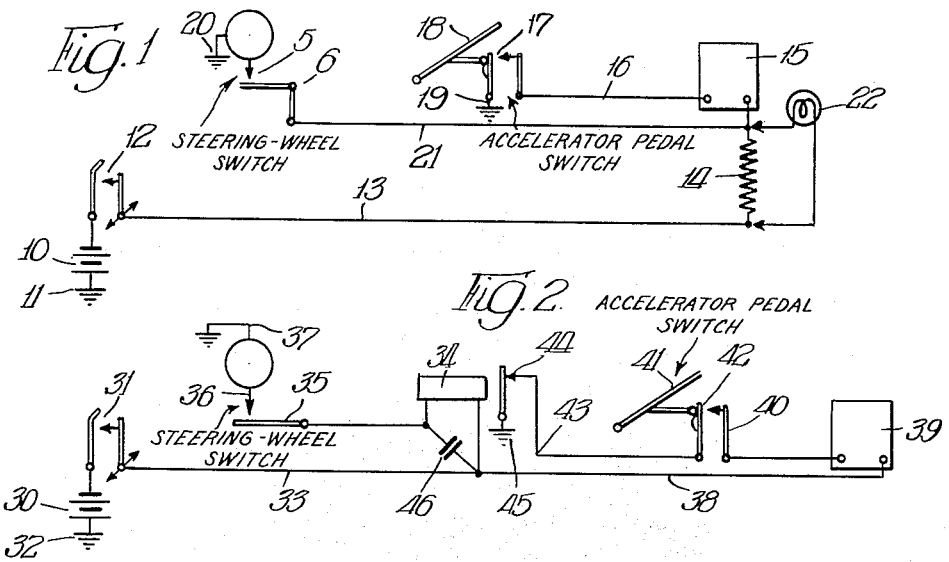
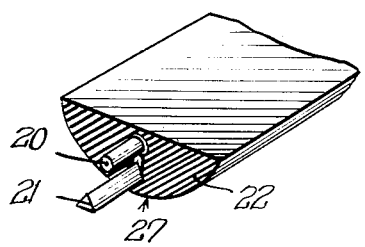
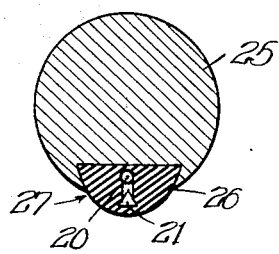
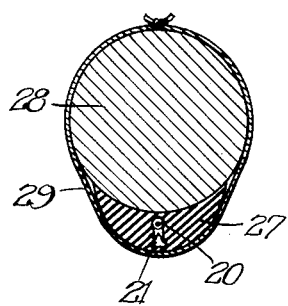
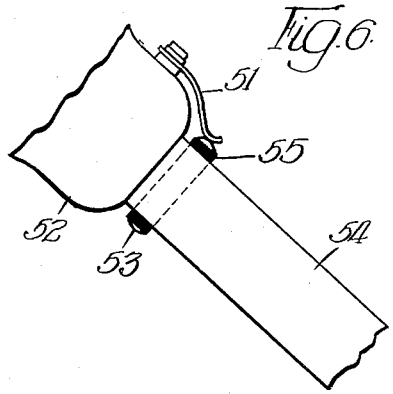
INVENTOR.
James S. Murray,
BY
George H. Simmons
Atty.

Patented Nov. 20, 1951

2,575,926

UNITED STATES PATENT OFFICE 2,575,926

SLEEP INHIBITOR FOR MOTOR VEHICLE OPERATORS

James S. Murray, Tampa, Fla.

Application April 12, 1949, Serial No. 87,079

5 Claims. (Cl. 177—311)

This invention relates to a signaling device for awakening a dozing driver in an automotive vehicle and has for its principal object a new and improved device of this kind.

It is a main object of the invention to provide a signaling device which will sound an audible alarm whenever the driver's grip on the steering wheel of the vehicle is relaxed while the accelerator pedal is out of normal or idling position.

Another object of the invention is to provide an alarm device that is automatically operative whenever the vehicle is operated and cannot be turned off and forgotten or ignored by the driver.

Another object of the invention is to provide a signaling device which is installed as a permanent part of the vehicle and requires no attachments to or operations by the driver to render it operative.

Another object of the invention is to provide a signaling device which permits the driver to relax his grip on the steering wheel while the motor is idling, or to remove one hand at any time for gear shifting, signaling, etc., without sounding an alarm.

Still another object of the invention is to provide a signaling device which may be installed on existing vehicles as an accessory, as well as on new vehicles as standard equipment.

Another object of the invention is to provide an audible alarm which can be manufactured and installed at low cost and maintained economically.

Further objects of the invention not specifically mentioned here will be apparent from the detailed description and claims which follow, reference being had to the accompanying drawings in which a preferred embodiment of the invention is shown by way of example and in which:

Fig. 1 is a schematic diagram of a circuit employing a resistor;

Fig. 2 is a schematic diagram of a circuit employing a relay;

Fig. 3 is a perspective view of a steering wheel switch contacting unit;

Fig. 4 is a cross sectional view of a steering wheel rim showing the contacting unit disposed in a groove therein;

Fig. 5 is a cross sectional view showing the contacting unit attached to a steering wheel rim by a jacket; and Fig. 6 is a fragmentary elevational view diagrammatically showing a preferred connection between the steering wheel hub and the steering post.

Many serious accidents involving automotive vehicles such as heavy trucks, busses, passenger cars and the like, occur because the driver falls asleep while driving. Numerous arrangements have been proposed in the prior art of which I am aware, for the purpose of awakening the driver should he momentarily doze off while the vehicle is in motion.

Certain of these prior art arrangements have included a master switch that is supposed to be thrown into operative position by the driver to render operative an alarm circuit which is closed, to sound an audible alarm, in the event that the driver falls asleep. These devices have not proved altogether satisfactory for the reason that oftentimes the driver forgets or neglects to turn on the alarm system and dozes off without being aware that the alarm is not in operative position. In other instances where the alarm has been automatically turned on when the vehicle is operated, unwanted signals have been given when the driver has stopped for stop lights, cross streets, loading platforms, and the like.

As is well understood, when a person becomes unduly drowsy and falls asleep, the muscles of the body relax; and should a vehicle driver fall asleep while driving the vehicle, his grip upon the steering wheel will become relaxed, and this fact has been utilized in the prior art devices of which I am aware to bring in an alarm. In certain of these prior art arrangements, each time the driver's grip on the steering wheel or the portion serving as the switch is relaxed or shifted, the alarm has been sounded; and as a result, if it has been possible to do so, the drivers have turned off the alarm to eliminate its annoyance whenever they relax their grip on the steering wheel under conditions where they may safely do so.

The present invention utilizes a steering wheel switch of suitable design in conjunction with an accelerator pedal switch, and these switches together jointly control an alarm circuit so that the alarm is sounded only when the grip on the steering wheel is relaxed while the accelerator is out of its normal or idling position. Thus if a driver falls asleep while traveling at a normal rate of speed and relaxes his grip upon the steering wheel, the position and weight of his leg and foot on the accelerator will maintain the accelerator in an out-of-normal position and an audible alarm will sound to awaken the driver. Should the driver relax his grip on the steering wheel while waiting at a stop light, or under any other circumstances where the accelerator is in normal position and the motor idling, no alarm will be sounded.

Large trucking companies, such as are employed in making long hauls with heavy loads, experience considerable damage loss due to the momentary dozing of their drivers. The present invention which is designed primarily to overcome this difficulty includes an alarm which may be attached to an existing steering wheel and vehicle, as well as an alarm device designed to be built into the vehicle as standard equipment.

In the circuit shown in Fig. 1 of the drawings, battery 10, which is the main battery of the vehicle, preferably having its positive pole connected to the frame of the vehicle, as indicated at 11, is connected to the ignition switch 12 of the vehicle, from which a main signaling wire 13 extends. This wire leads through a resistor 14 to one terminal of an audible signal 15, which signal may be a buzzer, bell, or the like, as desired. The other terminal of the signaling device is connected by a suitable conductor 16 to one of a pair of normally open contacts 17 that are adapted to be closed by the movement of the accelerator pedal 18 out of its normal position, the other contact 17 being connected to the frame of the vehicle, as indicated at 19. Thus it will be seen that as soon as the accelerator pedal is moved out of its normal position while the ignition switch is turned on, a circuit will be closed through the resistor and signaling device in series, and the signaling device will operate over this circuit. Contacts 17 may be operated directly from the accelerator pedal 18 or the linkage connected thereto, or, if desired, may be operated by a bellows type device connected to the intake manifold of the vehicle. Both types of switches are readily available on the open market.

A steering wheel switch, including contacts 5 and 6 closed by the grip of the driver on the steering wheel, closes a circuit from the frame of the vehicle, as indicated at 20, over conductor 21 to the junction of the resistor 14 and one terminal of the signaling device 15, thereby to apply the same potential to both terminals of the signaling device which will not operate under these conditions. So long as the driver maintains a grip on the steering wheel while the accelerator is out of normal, the signal will remain silent. If desired, a visual signaling device, such as a lamp 22, may be connected across the terminals of the resistor 14, causing the lamp to glow while the resistor is directly connected across the battery, thereby to inform the driver or others that the alarm device is functioning.

With the circuits thus closed, the signal 15 will operate as soon as the shunt around it is removed by the opening of contacts 5 and 6; and should the driver doze off, his normal grip on the wheel will quickly relax sufficiently to open these contacts. Any relaxing of the grip on the steering wheel, or complete removal of both hands therefrom, will, of course, open contacts 5 and 6 and cause the signal 15 to operate if the accelerator is out of normal.

The arrangement shown in Fig. 1 is economical to install and maintain, but requires a careful balance between the resistor and the signaling device. Since the resistor is connected directly across the battery during normal operation of the vehicle, it must be high enough to limit the current flow to a fairly low value. Since the signal 15 operates in series with the resistor, it must be designed to work on the current value available to it, and to sound an alarm loud enough to be heard over the operating noises of the vehicle.

In the circuit shown in Fig. 1, the sounding of the alarm is instantaneous once the steering wheel switch contacts 5 and 6 are opened. In the case of large trucks, busses, and the like, this may be advantageous. In the case of smaller vehicles, such as passenger cars, where the grip of the driver on the steering wheel may be relaxed momentarily in changing hand holds and in the making of sharp turns and the like, a slight delay between the opening of the steering wheel switch contacts and the sounding of the alarm may be advantageous.

In the circuit shown in Fig. 2, such a momentary delay is possible. In this circuit, the battery 30 is connected to the ignition key 31 and to the frame of the vehicle, as indicated at 32. A circuit is extended from the ignition switch through conductor 33 through the winding relay 34 through contacts 35 and 36 of the steering wheel switch to the frame at 37, so as to energize the relay whenever the driver grips the steering wheel while the ignition key is turned on. The conductor 33 is extended, as indicated at 38, to one terminal of the signaling device 39 and a circuit is extended through that device and its other terminal to contact 40 of a switch controlled by the accelerator pedal 41, the second contact 42 of this switch being closed against the contact 40 whenever the accelerator is out of its normal position. Contact 42 is connected by conductor 43 through normally closed contacts 44 on the relay 34, and from these contacts to the frame of the vehicle, as indicated at 45. Should the driver move the accelerator switch out of normal without having a firm grip upon the steering wheel, relay 34 will not be energized, contacts 42 and 40 will be engaged together, and the circuit of alarm 39 will be closed and that alarm will operate to produce an audible signal.

As soon as the steering wheel switch contacts are closed together, the relay will be operated and contacts 44 opened, thereby to break the circuit of the alarm. A condenser 46 connected across the terminals of the relay 34 will maintain the relay in operative position momentarily, even though the circuit through its winding be opened by the opening of contacts 35 and 36, so that if the driver of the vehicle should momentarily relax his grip on the steering wheel while the accelerator pedal is out of normal, an alarm will not immediately be sounded. However, the interval during which the relay 34 will be maintained in operative position by the action of condenser 46 is not great; and if the steering wheel grip is not promptly restored, the alarm will sound. This arrangement will permit ordinary manipulation of the steering wheel without unwarranted soundings of the alarm.

The circuit shown in Fig. 2 places the signaling device 39 directly across the battery and standard devices readily available on the open market may therefore be used. Relay 34 is placed across the battery during normal operation of the vehicle, and relays suitable for such use are readily available on the open market at reasonable cost. With condenser 46 omitted from the circuit, the operating characteristics of the circuit are the same as those of the circuit of Fig. 1.

Steering wheel switches which can be used in the systems shown in Figs. 1 and 2 can be either built in as an integral part of the wheel or added to an existing wheel as an attachment. In either case a pressure responsive device is located on the underside of the wheel so that the normal grip of the driver on the wheel will close contacts within the device, but the weight of the driver's hand or arm resting on the upper surface of the wheel will not maintain those contacts closed. Switching devices that are incorporated in the steering wheel itself are preferable for new vehicles and vehicles in which the steering wheel is to be replaced, while switching devices in the form of an attachment to be added to an existing steering wheel are preferable for old vehicles to which the alarm system is added.

In Fig. 3 there is shown a contacting device of form preferable for either a new installation or a conversion. In this contactor, a round contact bar 20 and a triangular contact bar 21 are supported in spaced-apart relation in a ribbon 22 of elastomer such as rubber. The elastomer, being compressible, will yield under the pressure of the grip of the driver and bars 20 and 21 will thus be brought together electrically. Bars 20 and 21 may conveniently be made of Phosphor bronze which is hard enough to resist strong grips on the steering wheel without damage and furthermore will not be adversely affected chemically by the elastomer.

The contacting device shown in Fig. 3 can be made in any manner within the teachings of the invention, preferably, however, the elastomer is molded to the desired shape and around the bars by an extension process.

In Fig. 4, I have shown how the contacting device can be installed in the rim of a steering wheel. In this figure, rim 25 of the wheel contains a groove 26 in its under face, in which groove the device 27 is positioned and secured by convenient means such as cement. In Fig. 5, the contacting device 27 is supported on the rim 28 by a suitable jacket which may be formed of leather, fabric or other pliant material, the jacket being affixed to the rim by sewing or lacing.

This jacket arrangement permits attaching the contacting device 27 to an unslotted rim. In either case, the contacting device extends in a full circle around the rim so as to be available at all points on the rim of the wheel.

In the arrangements of both Figs. 4 and 5, the contacting device is positioned so that the contacting bars in it will be forced together by the normal grip of the driver on the wheel. Suitable wires, not shown, are connected to bars 20 and 21 and extending along the underside of a spoke in the steering wheel to the hub where one of the wires is connected to the hub or other metallic part which is connected to the frame of the vehicle. The other wire may be extended through the steering column alongside the horn wire, or coiled several times around the steering post and thence down that post and to the signaling apparatus. Preferably, however, this second wire is connected to a wiper 51, Fig. 6, which is mounted upon and insulated from hub 52 of the steering wheel. This wiper 51 engages a ring 53 that is supported on the steering post 54 and insulated therefrom by suitable insulation 55. The ring 53 is connected to the signaling device by a wire that is carried on the steering post 54. The particular mode of installing the connecting means between the steering wheel switch and the signaling device, and the position of the signaling device on the vehicle, will both necessarily depend upon specific arrangements encountered and wide variations in installation are contemplated. Furthermore, while the form of steering wheel switch disclosed is preferred, the use of other switches now available is contemplated within the teachings of the invention.

From the foregoing, it will be apparent that the signaling device of the present invention is possessed of many advantages. The entire apparatus is mounted on the vehicle and requires no connections to devices worn or carried on the person of the driver. The audible signaling device itself may be permanently attached to the vehicle preferably in close proximity to the driver's head, so that the alarm will be clearly audible above ordinary noises attending the operation of the vehicle without being so loud as to be heard at any great distance from the vehicle. The system may be installed either on an existing vehicle or as a part of the standard equipment of a new vehicle, and in either case its operation is entirely automatic, requiring no conscious effort on the part of the driver. An audible alarm will be given whenever the driver relaxes his grip upon the steering wheel while the accelerator is out of its normal position; and, if desired, a visual signal, such as a lamp, may be lighted to assure the driver, or others, that the signaling device is in working order.

While I have chosen to show my invention by illustrating and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. In an alarm system for waking a dozing driver of an automotive vehicle, an audible signaling device, an accelerator switch having contacts closed when the accelerator is out of normal position, a steering wheel switch having contacts closed when the wheel is grasped by the driver, and circuit means over which said signaling device is short-circuited so long as the grip on the steering wheel is maintained and the steering wheel switch thereby closed while the accelerator is out of normal and the accelerator switch is operated.

2. In an alarm system for waking a dozing driver of an automotive vehicle, an audible signaling device, an accelerator switch having contacts closed when the accelerator is moved out of normal or idling position, a steering wheel switch having contacts closed when the wheel is grasped by the driver, and circuit means over which said signaling device is operated whenever said steering wheel switch contacts are opened while said accelerator switch contacts are closed.

3. In an alarm system for waking a dozing driver of an automotive vehicle, an electromagnetically operated audible signaling device, a resistor, an accelerator pedal switch, contacts in said switch closed when the pedal is out of its normal position, a circuit extending from one side of battery through said resistor and signaling device in series and through said pedal switch contacts in closed position to the other side of battery, a steering wheel switch, contacts in said steering wheel switch closed by the driver's grip upon the wheel, a shunt circuit extending through said steering wheel switch contacts in closed position to the junction of said resistor and signaling device to apply the same battery potential to both sides of the signaling device, said shunt circuit being opened at said steering wheel switch whenever the driver's grip on the wheel is relaxed and said signaling device being operated over said series circuit whenever said shunt circuit is opened while said accelerator pedal is out of its normal position.

4. In an alarm system for waking a dozing driver of an automotive vehicle, an audible electromagnetic signaling device, a switch having contacts closed by the accelerator pedal moving out of its normal position, a relay, contacts on said relay closed when the relay is in normal position, a circuit for said signaling device closed through said relay contacts in closed position and said accelerator switch contacts in closed position to operate the device to sound an alarm, a steering wheel switch, contacts in said steering wheel switch closed as the wheel is gripped by the driver, and a circuit for said relay closed through said steering wheel switch contacts in closed position to operate the relay and open said normally closed relay contacts thereby to maintain said alarm circuit open so long as the driver maintains a grip on the steering wheel while the accelerator pedal is out of its normal position.

5. In an alarm system for waking a dozing driver of an automotive vehicle, a relay, a steering wheel switch, contacts in said switch closed when the driver grips the steering wheel, a circuit for said relay closed through said contacts in closed position to operate the relay, contacts on said relay opened by said relay in operated position and closed by said relay in normal position, an accelerator switch, contacts in said accelerator switch closed when the accelerator is moved out of its normal position, an electromagnetically operated audible signaling device, a circuit for said device extending through said closed accelerator switch contacts and closed by said relay contacts in closed position thereby to operate said signaling device whenever the driver relaxes his grip on the steering wheel while the accelerator is out of normal position; and a condenser connected across said relay to maintain the relay in operated position momentarily after the steering wheel switch contacts are opened thereby to delay the operation of said signaling device momentarily.

JAMES S. MURRAY.

REFERENCES CITED

The following references are of record in the file of this patent:

UNITED STATES PATENTS

| Number | Name | Date |
|---|---|---|
| 2,199,060 | Young | Apr. 30, 1940 |
| 2,210,330 | Sequin et al. | Aug. 6, 1940 |
| 2,271,698 | Lofwall | Feb. 3, 1942 |